(12) United States Patent
Doyle

(10) Patent No.: US 6,845,984 B2
(45) Date of Patent: Jan. 25, 2005

(54) KEEPER FOR POSITIONING RING SEALS

(76) Inventor: Michael Doyle, 10001 Timothy La., Villa Park, CA (US) 92681

(*) Notice: Subject to any disclaimer, the term of this patent is extended or adjusted under 35 U.S.C. 154(b) by 332 days.

(21) Appl. No.: 09/882,343

(22) Filed: Jun. 13, 2001

(65) Prior Publication Data

US 2002/0063396 A1 May 30, 2002

Related U.S. Application Data

(63) Continuation-in-part of application No. 09/724,185, filed on Nov. 27, 2000.

(51) Int. Cl.[7] .............................................. F16J 15/06
(52) U.S. Cl. ........................ 277/317; 277/598; 277/591
(58) Field of Search ................................ 277/317, 321, 277/590, 591, 592, 593, 594, 595, 596, 597, 598, 602, 603, 609, 616, 626, 627, 628, 630, 637, 647; 285/43; 403/27

(56) References Cited

U.S. PATENT DOCUMENTS

| | | | | |
|---|---|---|---|---|
| 2,877,756 A | * | 3/1959 | McCauley et al. ...... 123/195 C |
| 4,095,809 A | * | 6/1978 | Smith ......................... 277/609 |
| 4,410,224 A | * | 10/1983 | Giulie ......................... 439/48 |
| 4,436,310 A | * | 3/1984 | Sawabe et al. ............. 277/630 |
| 4,648,607 A | * | 3/1987 | Yamada et al. ............. 277/598 |
| 4,813,691 A | * | 3/1989 | Schoenborn ................ 277/598 |
| 5,118,121 A | * | 6/1992 | Hellman, Sr. ............... 277/650 |
| 5,281,464 A | * | 1/1994 | Sekioka et al. ............. 277/598 |
| 5,713,582 A | * | 2/1998 | Swensen et al. ............ 277/312 |
| 5,730,448 A | * | 3/1998 | Swensen et al. ............ 277/630 |
| 5,735,532 A | * | 4/1998 | Nolan et al. ................ 277/630 |
| 6,367,803 B1 | * | 4/2002 | Loth .......................... 277/321 |

* cited by examiner

Primary Examiner—Anthony Knight
Assistant Examiner—Vishal Patel
(74) Attorney, Agent, or Firm—Drummond & Duckworth

(57) ABSTRACT

An improved keeper for positioning ring seals is provided. The keeper includes a substantially planar sheet defining upper and lower surfaces. Projecting through the planar sheet are one or more holes configured for affixing corresponding one or more ring seals. The keeper further includes one or more nodes which extend outwardly from the planar sheet beyond the dimensions of the mating surfaces between which a sealed joint is obtained. The one or more nodes identify the position and number of holes constructed for receiving corresponding ring seals.

8 Claims, 5 Drawing Sheets

KEEPER FOR POSITIONING RING SEALS

RELATED APPLICATIONS

This application is a continuation-in-part application of copending U.S. patent application Ser. No. 09/724,185, filed on Nov. 27, 2000.

BACKGROUND OF THE INVENTION

The present invention relates to keepers which are used to position ring seals between opposed mating surfaces.

Ring seals, often referred to as gaskets, are compressed between mating surfaces for making a gaseous or fluid-tight seal sealed joint between the opposed mating surfaces. Ring seals include simple "O rings", and also include "C seals", "V seals", and "Z seals". A C seal is circular and constructed with a radial cross section having a "C" shape. These C seals are constructed both with the open side of the C construction facing the center of the ring, and with the open side of the C seal facing away from the center of the ring. As two parallel mating surfaces are brought together with the C seal in the middle, the seal is compressed with the open side of the C cross section closing during compression. The ductile properties of the ring seal permit plastic deformation to occur without damaging the mating surface. To increase the elastic recovery of the seal, some C seals are provided with a circular elastic helical spring concentrically located within the center of the seal which alters the compression resistance and elasticity properties. Meanwhile, the V seal has a V cross section with the low point of the "V" constructed to point either inwardly or outwardly towards the center of the ring seal. Z seals are also typically circular and have a rectangular cross section. These seals typically employ offset grooves which are formed in the opposing mating surfaces which when forced together with the Z seal in the middle, compresses the seal into a "Z" cross section.

The above described seals are typically circular, and thus often referred to as "ring seals". However, ring seals may take numerous configuration, such as rectangular. Ring seals also vary greatly in size. For example, ring seals can be extremely small, often only a few millimeters in diameter. When the ring seals are small in size, it is extremely difficult to manually position them properly between mating surfaces. This problem is particularly troublesome when trying to position numerous ring seals adjacent to one another between a single pair if mating surfaces.

To overcome this problem, ring seals are often affixed to keepers prior to being positioned between mating surfaces. A keeper is a substantially planar sheet, typically of metal, which includes one or more holes for affixing a ring seal. Each ring seal typically includes a circumferential groove formed at the ring seal's outer edge which is sized to receive the holes formed in the keeper. To position the ring seal in place and affix the ring seal to the keeper, the ring seal is typically pressed into one of the keeper's holes, which elastically deforms the keeper, until the hole's edge projects into the ring seal's circumferential groove. The holes formed in the keepers are positioned so that ring seals are properly positioned between opposed mating surfaces. To assist the keeper in maintaining proper position between mating surfaces, the keeper may include one or more bolt holes for receiving bolts which maintain the opposed mating surfaces together.

Keepers typically have substantially the same dimensions as the mating surfaces. Thus, once mating surfaces have been positioned together with the keeper between the mating surfaces, the keeper cannot be seen, or only the edge of the keeper can be seen. This is not a problem where a proper keeper and ring seal assembly are positioned between the mating surfaces. However, there are literally dozens or hundreds of different keeper configurations, each constructed with a different number of ring seals or with the ring seals positioned in different places. As a result of this multitude of different keeper constructions, it is common for persons to place an incorrect keeper and ring seal assembly between mating surfaces. For example it is common for technicians to place a two-hole keeper affixing two ring seals between a mating surface having three bores for passing gases or fluids. As a result, a fluid or gaseous-type seal is not established and the system leaks. Unfortunately, once the mating surfaces are brought together, it is often impossible to determine the source of the leak as it is impossible to determine what keeper assembly has been positioned between the mating surfaces.

Thus, it would be desirable to provide an improved keeper which can be identified visually even after it has been positioned between two mating surfaces.

SUMMARY OF THE INVENTION

The present invention addresses the aforementioned disadvantages by providing an improved keeper for positioning ring seals between opposed mating surfaces. The keeper, similar to previous keeper constructions includes a substantially planar sheet including an upper surface and lower surface. The upper surface of the planar sheet is intended for engaging a first mating surface, while the opposed lower surface is intended for engaging a second mating surface. The planar sheet further includes one or more holes which are sized and configured for receiving a corresponding ring seal. Preferably, though not necessarily, the planar sheet includes one or more bolt holes. The bolt holes are provided so that when the mating surfaces are compressed together with the planar sheet of the keeper between the mating surfaces, a bolt or similar fastener can be used to maintain the mating surfaces together. These bolt holes are also intended to be used for properly aligning the keeper and ring seal assembly between the mating surfaces.

The substantially planar sheet of the keeper may be constructed in numerous configurations. Preferably, the substantially planar sheet is constructed having substantially the same dimensions as the two mating surfaces between which the ring seals are intended to provide a sealed joint. By providing a keeper having dimensions the same as the mating surfaces, the edges of the keeper can be aligned with the edges of the mating surfaces to assist in proper alignment of the keeper and ring seal assembly between the mating surfaces.

The keeper of the present invention also includes one or more nodes which extend from the keeper's planar sheet outwardly beyond the edge of the opposed mating surfaces. Preferably, the number of nodes projecting outward from the opposing mating surfaces corresponds to the number and position of the keepers's holes used to affix ring seals. Thus, a person seeing the nodes of the keeper and identifying their number and position can immediately determine the number and position of ring seals positioned within the keeper, even if the ring seals themselves are visually obstructed. For example, the keeper may include one node for each ring seal in the keeper assembly. Thus, where the keeper includes three holes affixing three rings, the keeper includes three nodes. Alternatively, the keeper may employ a different standard in which two, or even three, nodes are provided to identify each keeper hole affixing a ring seal. Thus, employing a standard wherein the keeper includes two nodes for each hole, a keeper including three holes affixing three ring seals would include six nodes. Of course, a person using the keepers of the present invention would have to know what standard was being employed when viewing a keeper assembly between two mating surfaces to determine the number of holes and ring seals within the keeper assembly.

In an alternative embodiment of the invention, the keeper includes one or more nodes projecting beyond the mating surfaces which display indicia identifying the keeper assembly. The indicia may simply include a display of the model number of the keeper and ring seal assembly. In the alternative, the indicia displayed on the node may simply provide a pictorial depiction of the size, number and position of ring seals within the keeper assembly. Thus a person inspecting the keeper's nodes and indica displayed on the nodes can determine if a correct keeper and ring seal assembly has been positioned between mating surfaces.

It is thus an object of the present invention to provide a keeper assembly for positioning ring seals between mating surfaces which can be visually inspected subsequent to the keeper and ring seal assembly being positioned between mating surfaces for identifying the keeper and ring seal configuration being employed.

It is still an additional object of the present invention that the keeper be simple and inexpensive to manufacture.

These and other features and advantages of the present invention will be appreciated by those skilled in the art from the following detailed description taken in conjunction with the drawings.

DETAILED DESCRIPTION OF THE INVENTION

Figure 1:
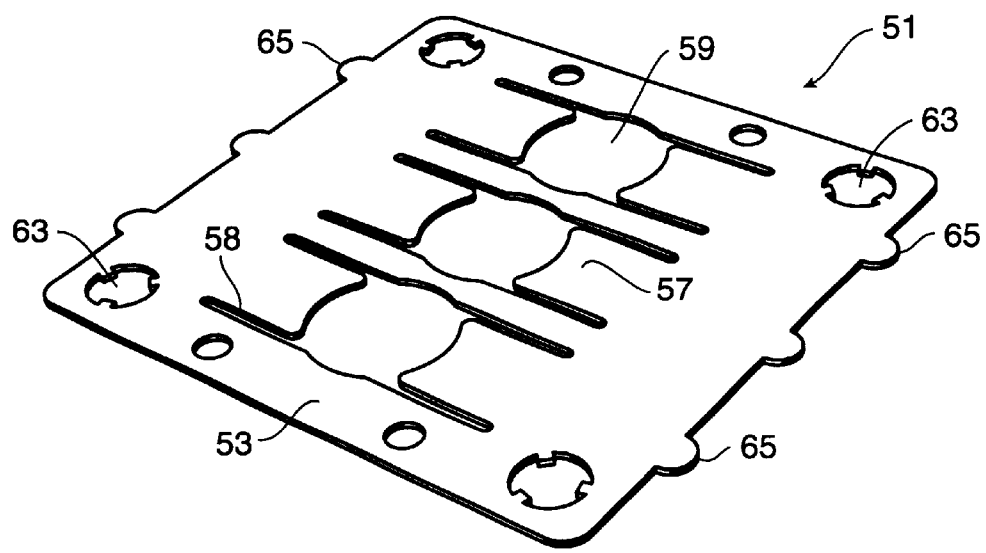
FIG. 1 is a perspective view of a keeper of the present invention.
Figure 2:
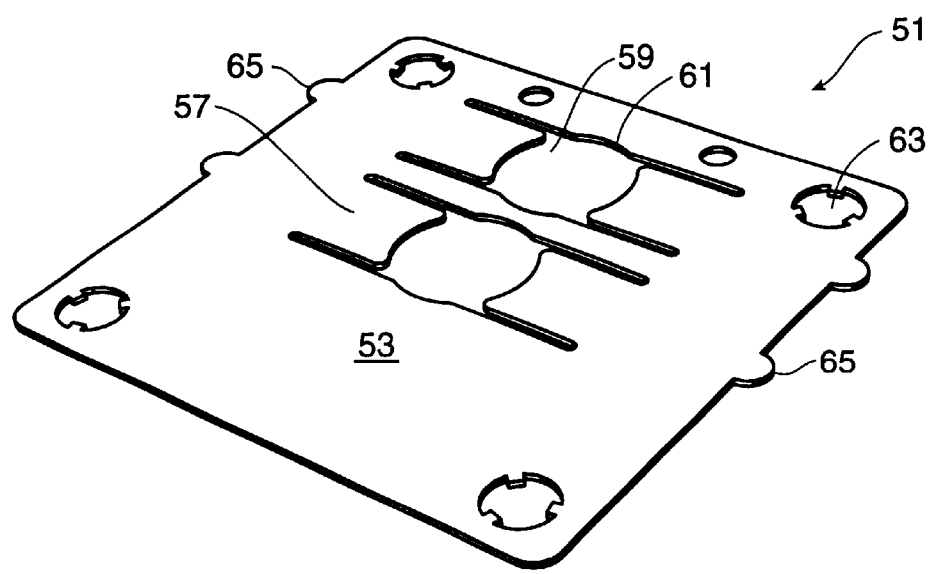
FIG. 2 is a perspective view illustrating variation of the keeper of the present invention shown in FIG. 1.
Figure 3:
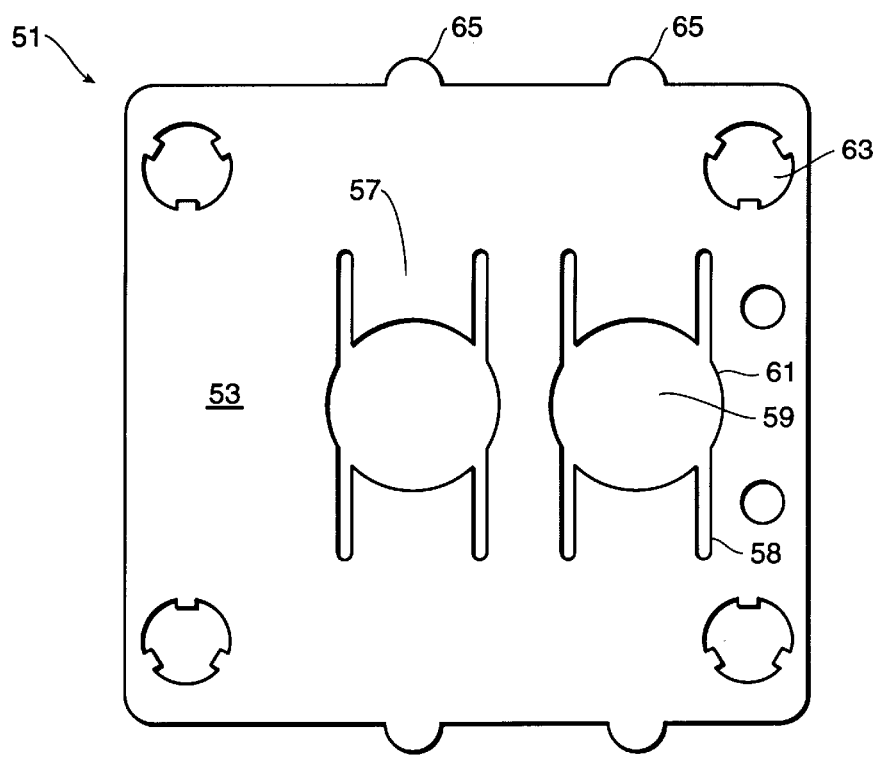
FIG. 3 is an elevational view of the keeper of the present invention shown in FIG. 2.
Figure 4:
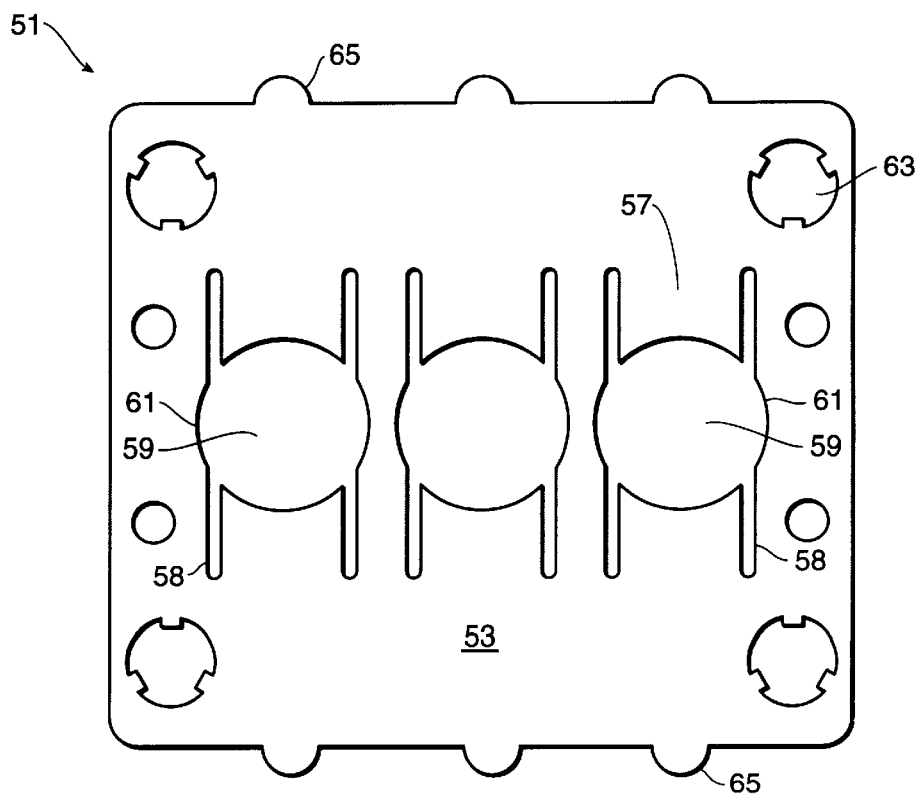
FIG. 4 is an elevational view of the keeper of the present invention shown in FIG. 1.
Figure 5:
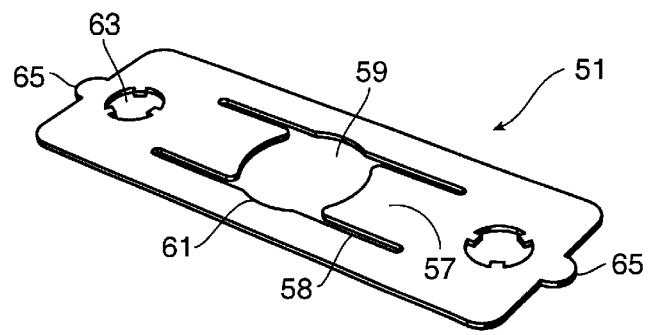
FIG. 5 is a perspective view of a third variation of a keeper of the present invention.

While the present invention is susceptible of the embodiment in various forms, as shown in the drawings, hereinafter will be described the presently preferred embodiments of the invention with the understanding that the present disclosure is to be considered as an exemplification of the invention and it is not intended to limit the invention to the specific embodiments illustrated.

With reference to the figures, the present invention is directed to a keeper 51 for positioning ring seals 1 between mating surfaces 31. The keeper 51 of the present invention is preferably constructed of a planar sheet having an upper surface 53 and a lower surface (not shown). The keeper may be constructed of various materials, as can be selected by those skilled in the art. Metals and alloys exhibiting limited thermal expansion and non-corrosive properties such as alloys including aluminum, copper, silver, nickel, hastelloy or stainless steel are preferred.

Figure 6:
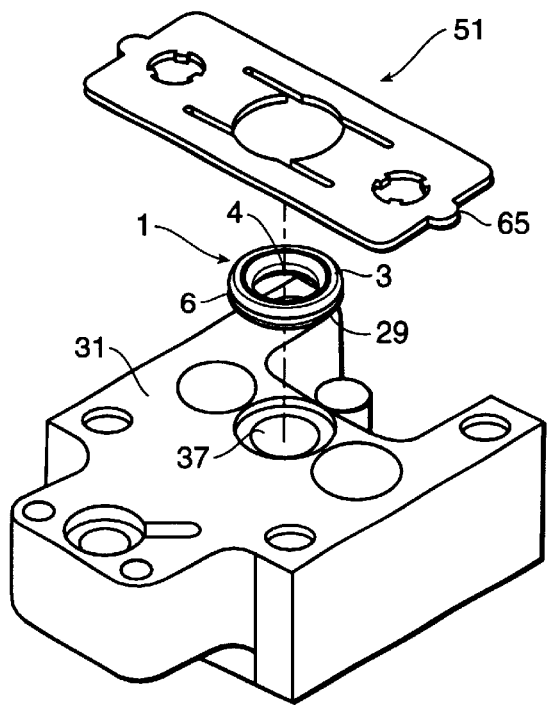
FIG. 6 is a perspective view illustrating a keeper of the present invention above a ring seal and mating surface.
Figure 7:
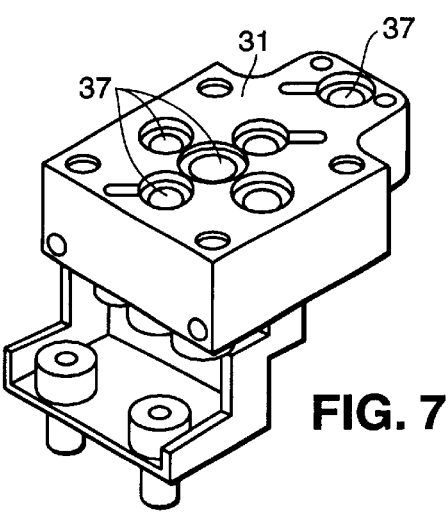
FIG. 7 is perspective view illustrating a second mating surface for use with the keeper of the present invention.
Figure 8:
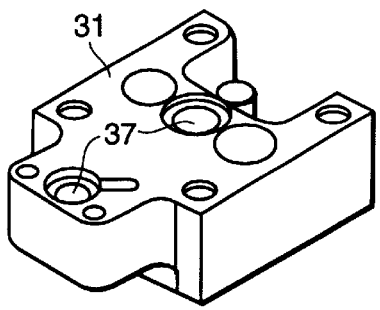
FIG. 8 is perspective view illustrating a third mating surface for use with the keeper of the present invention.
Figure 9:
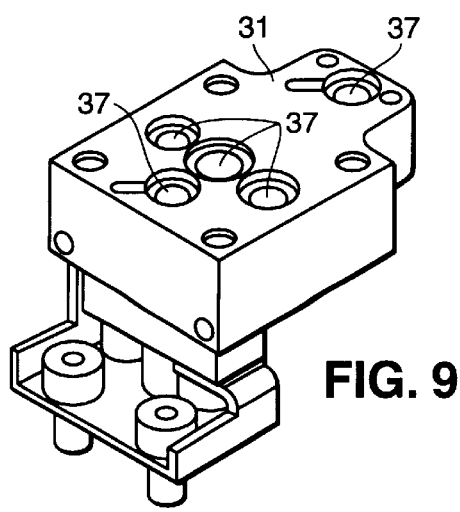
FIG. 9 is perspective view illustrating a fourth mating surface for use with the keeper of the present invention.

As shown in the FIGS. 1–5, the keeper 51 may be constructed in various configurations having any number of holes 59 defining circular rims 61. Correspondingly, FIGS. 6–9 illustrate that mating surfaces 31 may include innumerable central bores 37. For example, FIG. 6 illustrates a surface 31 including a bore 37 for use with a keeper 51 having only a single hole 59. Meanwhile, FIGS. 7–9 illustrate surfaces 31 which include several closely spaced bores which would require keepers 51 having a corresponding plurality of holes 59.

The holes are sized and positioned for receiving ring seals 1 and preferably, each hole 59 includes a pair of radially opposing tabs 57 formed by lateral slits 58. The tabs are constructed for limited deformation to allow a ring seal 1 to be forced and locked into each hole 59. Preferred keepers include one or more bolt holes 63. The bolt holes are provided so that once mating surfaces have been brought together with a keeper therebetween, bolts or similar fasteners may be used to lock the assembly together.

Figure 10:
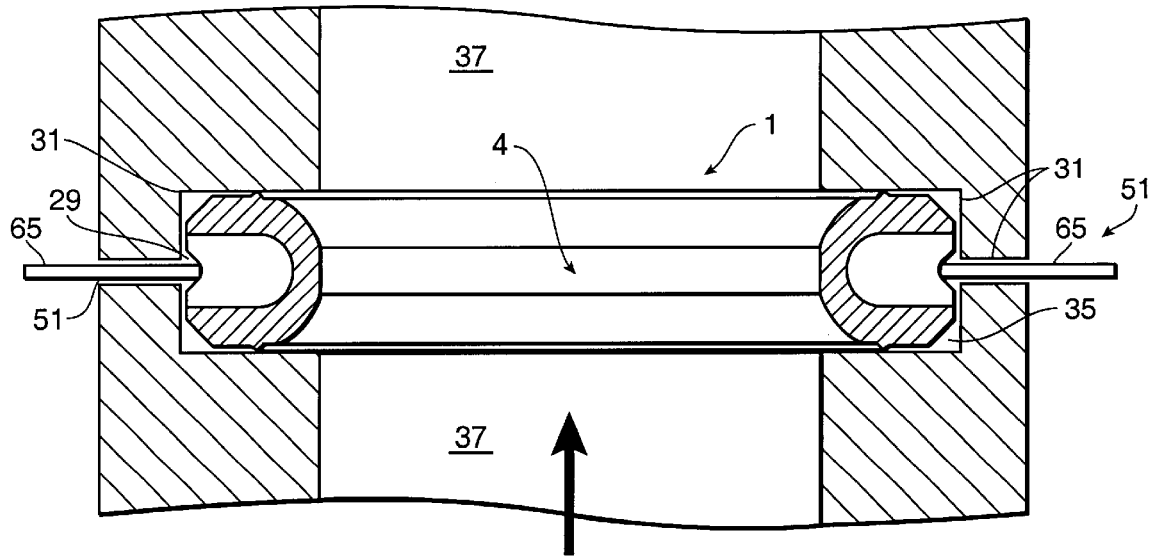
FIG. 10 is a cross sectional view illustrating a ring seal and keeper assembly of the present invention between two mating surfaces.

FIGS. 6 and 10 illustrate a typical ring seal 1 for use with a keeper of the present invention. The ring seal 1 includes an annularly shaped body 3 having an axially aligned center hole 4 for permitting the passage of gases or fluids. As shown in these figures, the ring seal shown is substantially similar to a "C" seal including a circumferential groove 29. The keeper's circular rim 61 is constructed to reside within the ring seal's circumferential groove 29 when a ring seal is pressed into the keeper, thereby affixing the ring seal within the keeper. As shown in FIG. 10, when a ring seal 1 is positioned between mating surfaces 31, the thickness of the ring seal provides a space between the mating surfaces in which a keeper can be positioned. The thickness of the keeper is less than the space between mating surfaces so that the ring seal can be properly compressed to provide a gaseous and fluid-tight sealed joint.

As shown in FIGS. 6–9, opposed parallel mating surfaces 31 may be constructed in numerous configurations including any number of bores 37 for the passage of fluids or gases. Each bore requires a corresponding ring seal, requiring that keepers 51 be constructed in a variety of configurations including a wide variety in the number and position of the ring seals. Placing an incorrect keeper having ring seals of incorrect number or position between the mating surfaces would not properly provide a sealed joint between the mating surfaces. It is thus desirable to provide a means for determining the configuration of the keeper and ring seal after the mating surfaces have been brought together in case a leak has been found in the system.

With reference to FIGS. 1–6 and 10, the keeper 51 of the present invention has a similar construction to prior art keepers including a substantially planar sheet 52 defining an upper surface 53 and a lower surface 55. However, the keeper of the present invention also includes one or more nodes 65 which extend outwardly from the planar sheet 52. The nodes identify the keeper 51 and identify the number and position of the holes 59 and ring seals 1 within the keeper and ring seal assembly. The nodes 65 are constructed to extend beyond the edge of the mating surfaces 31 so that they can still be seen when the keeper is positioned between the mating surfaces.

In a preferred embodiment, and as shown in FIGS. 1–6, the keeper is constructed to include two nodes 65 for each keeper hole. The nodes are aligned longitudinally on each side of a keeper hole and aligned with the center line of each hole so that a person inspecting the nodes of the keeper can instantly determine that each node on a side of the keeper identifies a particular hole and its corresponding ring seal, and that the hole and ring seal are positioned directly adjacent to the particular node. Though not shown in the figures, the nodes may be constructed of different sizes for identifying different sizes of holes 59 and ring seals 1.

In an alternative embodiment, the keeper may include only a single node on a particular side of the keeper corresponding to each hole of the keeper. This construction, including only a single node for each hole within the keeper, provides a relatively insignificant savings in material costs. However, depending on the construction and placement of the mating surfaces which are intended to be joined, inspection of the nodes of the keeper may be difficult, particularly where the keeper only has one node corresponding to each keeper hole. It is therefore preferred that the keeper of the present invention include two nodes, with a single node on each side of the keeper, for identifying each hole and ring seal affixed to the keeper.

Figure 11:
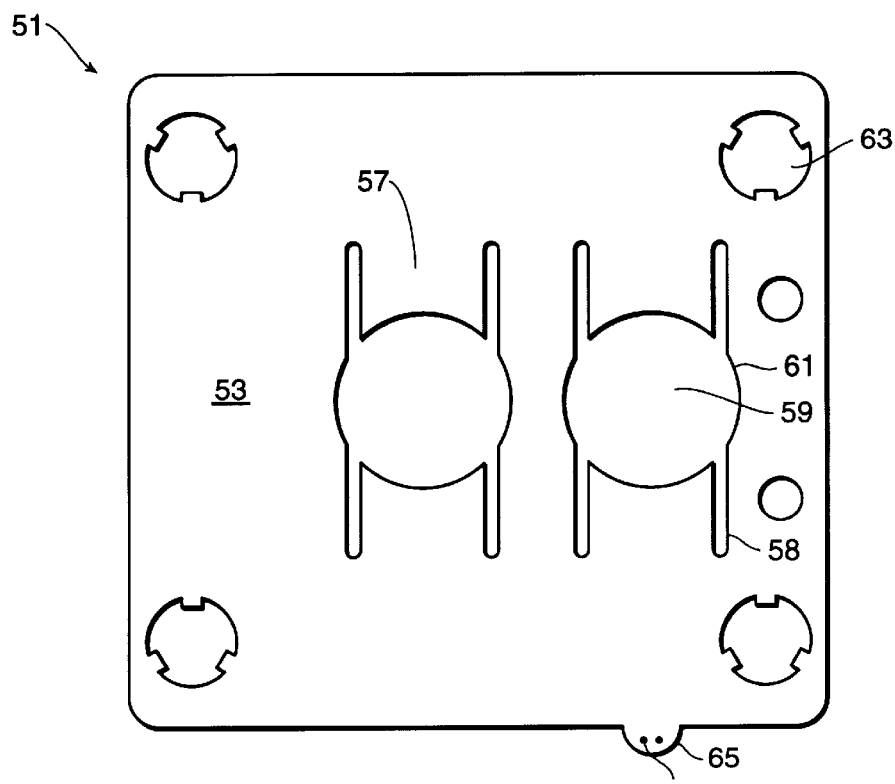
FIG. 11 is an elevational view of an additional embodiment of the keeper of the present invention.
Figure 12:
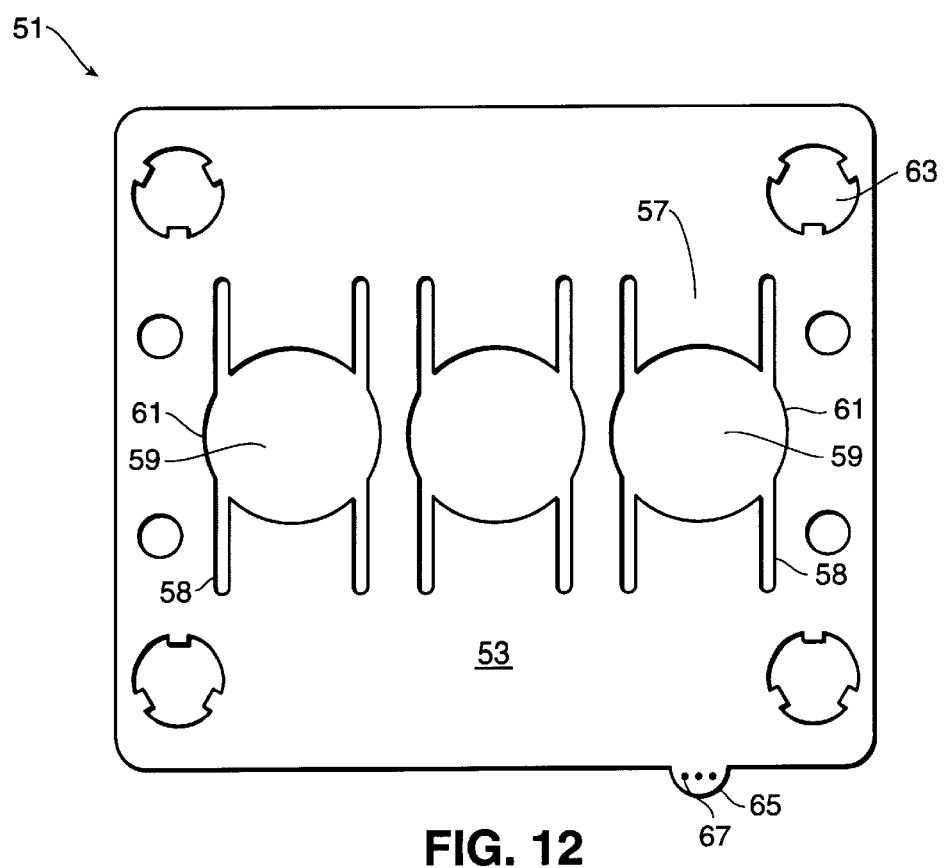
FIG. 12 is an elevational view illustrating a variation of the keeper of the present invention shown in FIG. 11.

As shown in FIGS. 11 and 12, in still an alternative embodiment of the invention, the keeper 51 of the present invention includes one or more nodes 65 which do not necessarily correspond in number or position to the holes of the keeper. Instead, the node or nodes 65 are provided with visual indicia 67, such as a marking by stenciling, laser etching, or the like, which identify the number and location of the keeper holes and ring seals. For example, the indicia may include a simple display of a manufacturer's part number from which one can determine the identity and configuration of the keeper and ring seal assembly. Alternatively, as shown in the figures, the node may include indicia displaying a pictorial depiction of the size, number and placement of the keeper holes and ring seals of the keeper assembly. For example, FIG. 11 illustrates a keeper having two holes for affixing two ring seals. Two dots 67 are provided on the node 65 to identify that the keeper has two keeper holes 59. Similarly, FIG. 12 illustrates a keeper 51 having three dots 67 displayed on a single node for indicating that the keeper has three holes 59. The dots may be sized and colored to identify particular sizes of the keeper holes and/or the particular ring seal within the holes. Thus a person inspecting the keeper's nodes and indica displayed on the nodes can determine whether a correct keeper and ring seal assembly has been positioned between mating surfaces.

Having described the invention in such terms to enable those skilled in the art to make and use it, and having identified the present best mode of practicing it,

I claim:

1. A keeper for positioning ring seals between first and second axially opposed mating surfaces, the keeper comprising:

a substantially planar sheet defining an upper surface for engaging the first mating surface and a lower surface for engaging the second mating surface, said planar sheet further including one or more holes configured for receiving one or more ring seals; and one or more nodes which extend outwardly from said planar sheet beyond the mating surfaces so as to be visible even after the mating surfaces are joined together with the planar sheet there between, said one or more nodes identifying the number of said one or more holes.

2. The keeper of claim 1 wherein said one or more nodes identifies the position of said one or more holes.

3. The keeper of claim 2 wherein the position of said nodes identifies the position of said holes.

4. The keeper of claim 3 wherein two nodes are provided to identify the position of said holes.

5. The keeper of claim 1 wherein the number of nodes correspond to the number of holes in the keeper configured for receiving ring seals.

6. The keeper of claim 5 wherein two nodes are provided for each hole configured for receiving a ring seal.

7. The keeper of claim 1 wherein the node includes visual indicia identifying the number of hole.

8. The keeper of claim 1 wherein the node includes visual indicia identifying the position of said keeper holes.

* * * * *